United States Patent
Zehner et al.

(12) 
(10) Patent No.: US 10,220,887 B2
(45) Date of Patent: Mar. 5, 2019

(54) CARGO BODY AND METHOD OF ASSEMBLING THE SAME

(71) Applicant: STI Holdings, Inc., Stoughton, WI (US)

(72) Inventors: Riley Zehner, Menomonee Falls, WI (US); Todd Randall Eicher, Monticello, WI (US)

(73) Assignee: STI Holdings, Inc., Stoughton, WI (US)

( * ) Notice: Subject to any disclaimer, the term of this patent is extended or adjusted under 35 U.S.C. 154(b) by 63 days.

(21) Appl. No.: 15/705,459

(22) Filed: Sep. 15, 2017

(65) Prior Publication Data

US 2018/0001940 A1    Jan. 4, 2018

Related U.S. Application Data

(63) Continuation of application No. 15/012,359, filed on Feb. 1, 2016, now Pat. No. 9,764,780.

(51) Int. Cl.
| | |
|---|---|
| *F16B 7/18* | (2006.01) |
| *B62D 33/04* | (2006.01) |
| *B62D 25/06* | (2006.01) |
| *B62D 25/20* | (2006.01) |
| *B62D 27/02* | (2006.01) |

(52) U.S. Cl.
CPC ........... *B62D 33/044* (2013.01); *B62D 25/06* (2013.01); *B62D 25/2054* (2013.01); *B62D 27/023* (2013.01); *F16B 7/187* (2013.01)

(58) Field of Classification Search
CPC .... B62D 33/044; B62D 27/023; B62D 25/06; B62D 25/2054; F16B 7/187

USPC ................................................ 296/186.1, 191
See application file for complete search history.

(56) References Cited

U.S. PATENT DOCUMENTS

| | | |
|---|---|---|
| 2,332,752 A | 10/1943 | Ratcliff |
| 3,205,001 A | 9/1965 | Abolins |
| 4,496,061 A | 1/1985 | Highsmith |
| 4,502,610 A | 3/1985 | Todd |
| 4,852,937 A | 8/1989 | Lemieux |
| 4,974,377 A | 12/1990 | Dominitz et al. |
| 5,026,112 A | 6/1991 | Rice |
| 5,398,909 A | 3/1995 | Sandwith |
| 5,454,612 A | 10/1995 | Christensen |
| 5,769,478 A | 6/1998 | Vernese |
| 5,823,501 A | 10/1998 | Schmidt et al. |
| 6,059,258 A | 5/2000 | Jackson |
| 6,082,806 A | 7/2000 | Bogard |

(Continued)

OTHER PUBLICATIONS

Dual Canoe Trailer, Castle Equipment Co., Retrieved from the Internet on Oct. 20, 2015 <URL: http://www.castlecraft.com/canoe_dual.htm>.

*Primary Examiner* — Pinel E Romain
(74) *Attorney, Agent, or Firm* — Michael Best & Friedrich LLP

(57) ABSTRACT

The invention provides a method of assembling a roof of a cargo body. A plurality of sidewalls are provided, each comprising a side panel and an upper rail coupled to the side panel. A roof panel is located above the plurality of sidewalls adjacent the upper rails. A roof bow extends between the upper rails below the roof panel. The roof bow is fixed to a track of one of the upper rails with a fastener.

20 Claims, 7 Drawing Sheets

(56) References Cited

U.S. PATENT DOCUMENTS

| | | | |
|---|---|---|---|
| 6,334,642 B1 * | 1/2002 | Waldeck | B62D 27/065 296/193.03 |
| 6,764,245 B2 | 7/2004 | Popovski | |
| D543,491 S | 5/2007 | Weekes | |
| 7,530,614 B2 | 5/2009 | Nichols | |
| 8,414,067 B2 * | 4/2013 | Howard | B62D 33/046 156/91 |
| 8,985,921 B2 | 3/2015 | McCloud | |
| 9,097,443 B2 | 8/2015 | Liu et al. | |
| 2009/0159592 A1 | 6/2009 | Vitalis et al. | |
| 2015/0353138 A1 | 12/2015 | Fenton | |

\* cited by examiner

CARGO BODY AND METHOD OF ASSEMBLING THE SAME

CROSS-REFERENCE TO RELATED APPLICATIONS

This application is a continuation of U.S. patent application Ser. No. 15/012,359, filed on Feb. 1, 2016, the entire contents of which are incorporated by reference herein.

BACKGROUND

The invention relates to cargo body construction, for example, for over-the-road trailers pulled by semi tractors. In particular, the invention relates to trailer sidewall panels and joints for such sidewall panels, in addition to trailer doors, walls, floors, and roofs.

SUMMARY

In some embodiments, the invention provides a method of assembling a roof of a cargo body. A plurality of sidewalls are provided, each comprising a side panel and an upper rail coupled to the side panel. A roof panel is located above the plurality of sidewalls adjacent the upper rails. A roof bow extends between the upper rails below the roof panel. The roof bow is fixed to a track of one of the upper rails with a fastener.

In some embodiments, the invention provides a cargo body comprising a floor comprising a floor panel and a cross member for supporting the floor panel, and a plurality of sidewalls, each sidewall comprising a side panel and a lower rail coupled to the side panel. The plurality of sidewalls extend from the floor at the lower rails and at least partially bound a cargo receiving volume in cooperation with the floor panel. The cargo body further comprises a track extending along each of the lower rails and a fastener coupling the cross member to the rail. The fastener is slidably adjustable to different positions along the track to position the cross member to different locations along the rail.

Some embodiments of the present invention provide a cargo body comprising a floor, a roof, a plurality of sidewalls extending from the floor to the roof to define a cargo receiving volume in cooperation with the floor and the roof, a track attached to one or more of the floor, roof, and sidewall of the plurality of sidewalls, the track having an elongated slot facing the cargo receiving volume of the cargo body, and a fastener received within the elongated slot and slidably engageable along the track within the elongated slot for adjustably securing a component of the cargo body to different locations along the track.

DETAILED DESCRIPTION

Figure 1:
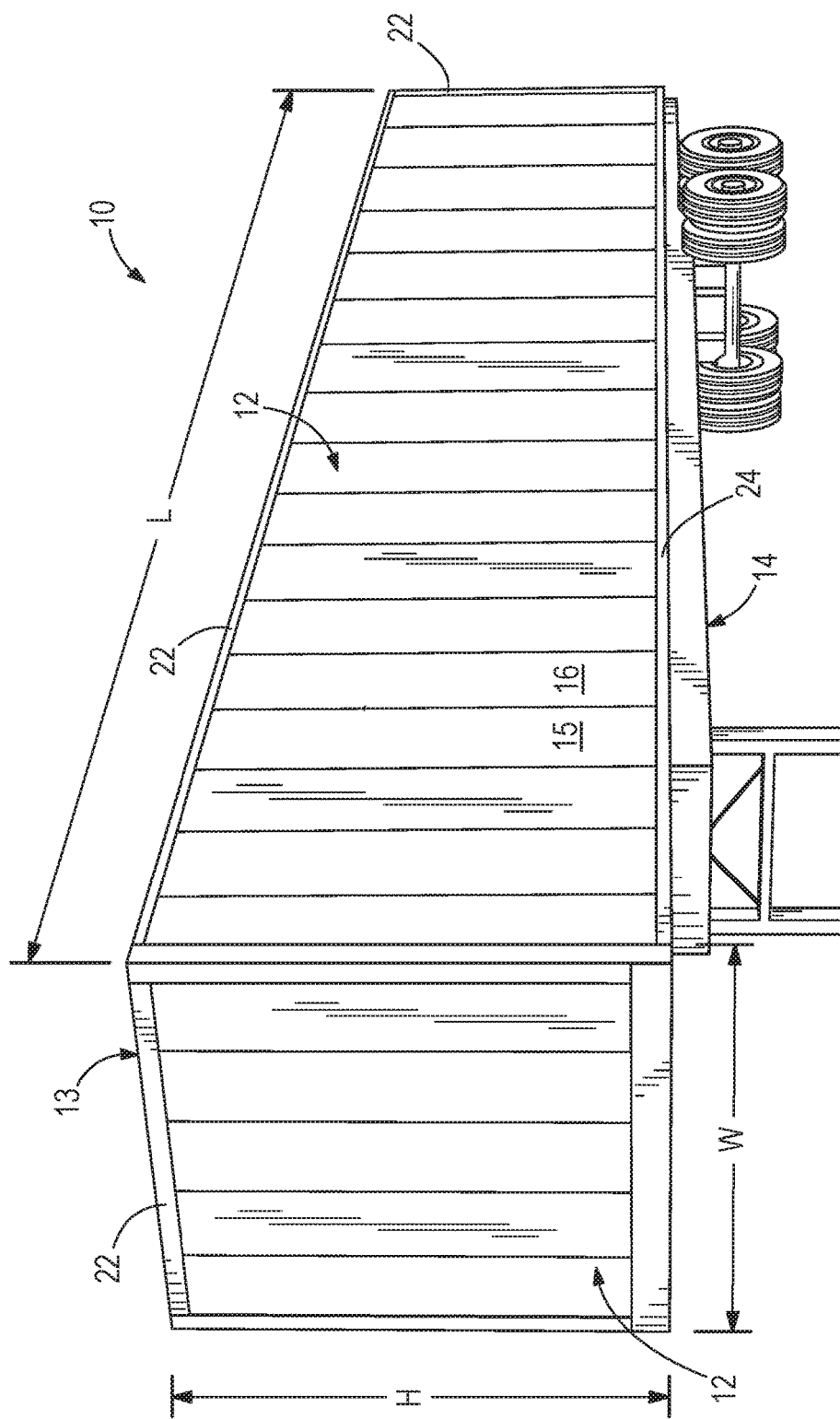
FIG. 1 is a perspective view of a trailer, including a plurality of sidewalls having sidewall joints, according to one embodiment of the present invention.
Figure 2:
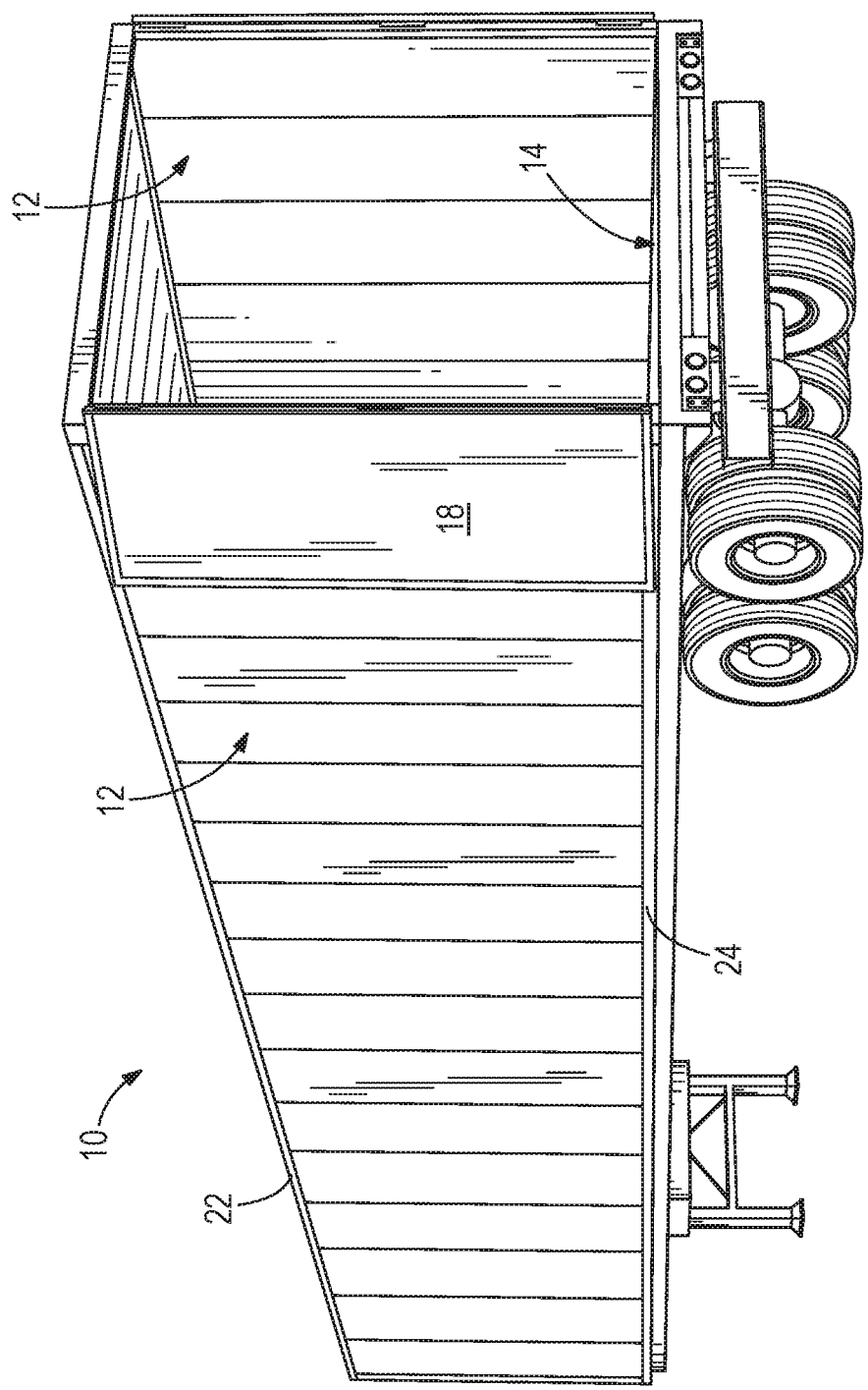
FIG. 2 is an alternate perspective view of the trailer of FIG. 1.

FIGS. 1 and 2 illustrate a cargo body configured as a trailer 10 for over-the-road use with a truck to transport large cargo volumes. As shown, the trailer 10 is a semi-trailer configured for use with a road tractor (i.e., in forming a so-called 18-wheeler). Aspects of the invention are not necessarily limited to such a trailer, and other trailer and cargo body configurations are understood as optional. The trailer 10 includes a chassis having axles with multiple sets of wheels, although similar cargo bodies may be provided with alternate rolling chassis constructions or none at all. The trailer 10 defines a length L in a longitudinal or transport direction. The length L can be 53 feet in some constructions, although the trailer can be manufactured to other lengths greater than or less than 53 feet. Perpendicular to the longitudinal direction, the trailer 10 defines a width W and a height H. The width W cooperates with the length L to define a plan view footprint of the trailer 10, while the height H is measured perpendicular to the footprint (i.e., perpendicular to the ground). Subtracting for wall thicknesses, the length L, the width W, and the height H cooperate to define a cargo receiving interior volume of the trailer 10. The trailer 10 includes a plurality of sidewalls 12, including two primary lengthwise sidewalls 12 and a sidewall 12 facing the leading direction and spanning between the two primary lengthwise sidewalls 12. All of the sidewalls 12 extend between a roof 13 of the trailer 10 and a floor 14 of the trailer 10. As discussed in further detail below, the sidewalls 12 can be constructed of pairs of panels 15, 16 joined together by joints extending parallel to the direction of the trailer height H between the roof 13 and the floor 14. Top rails or upper rails 22 and bottom rails 24 are provided to flank and secure the upper and lower edges of each of the sidewall panels 15, 16. At the rear of the trailer 10 as shown in FIG. 2, at least one door panel 18 is provided to selectively open for accessing the interior cargo volume for loading and unloading.

Figure 3:
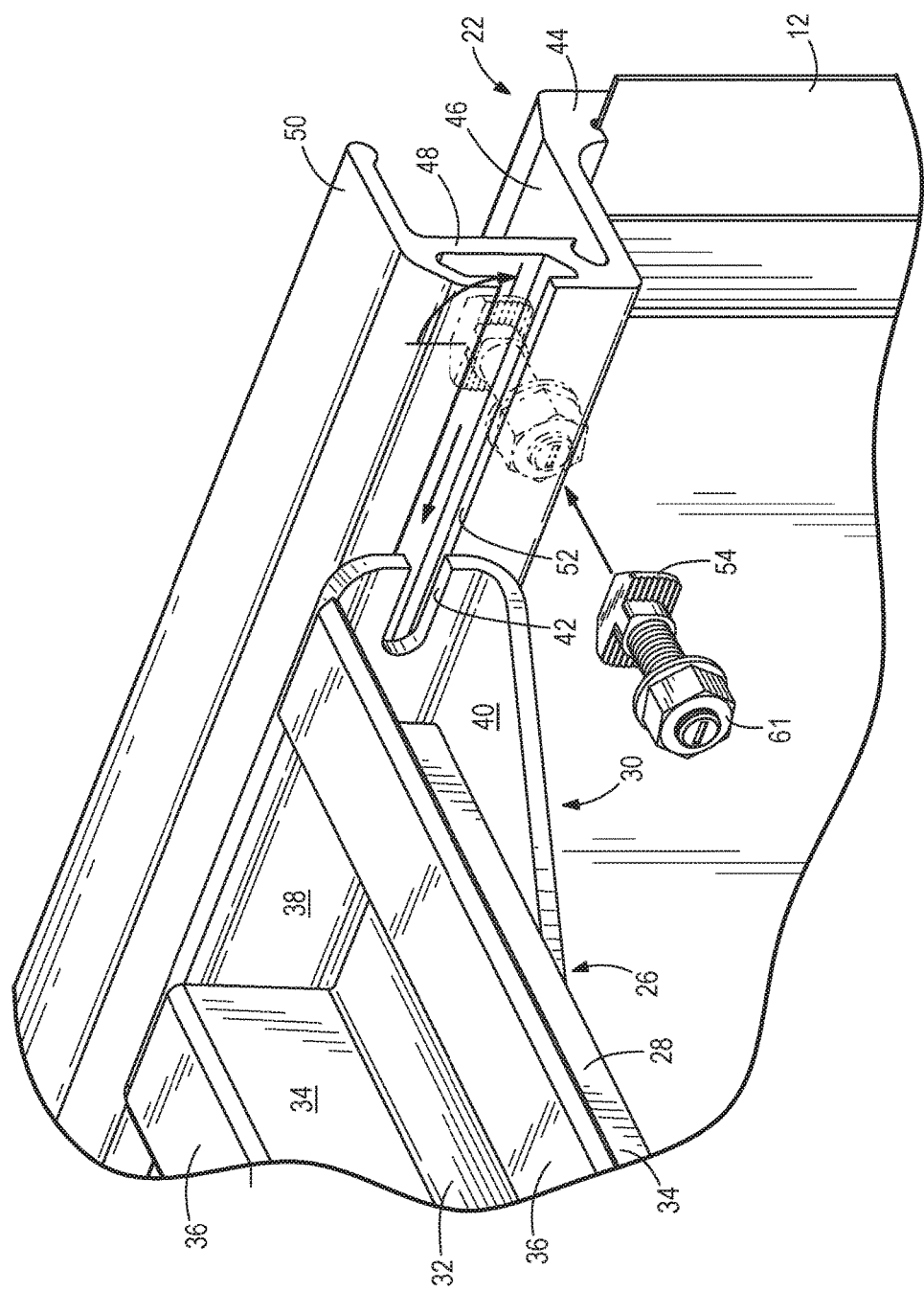
FIG. 3 is a partially exploded perspective view of a roof bow and upper rail of the present invention.
Figure 4:
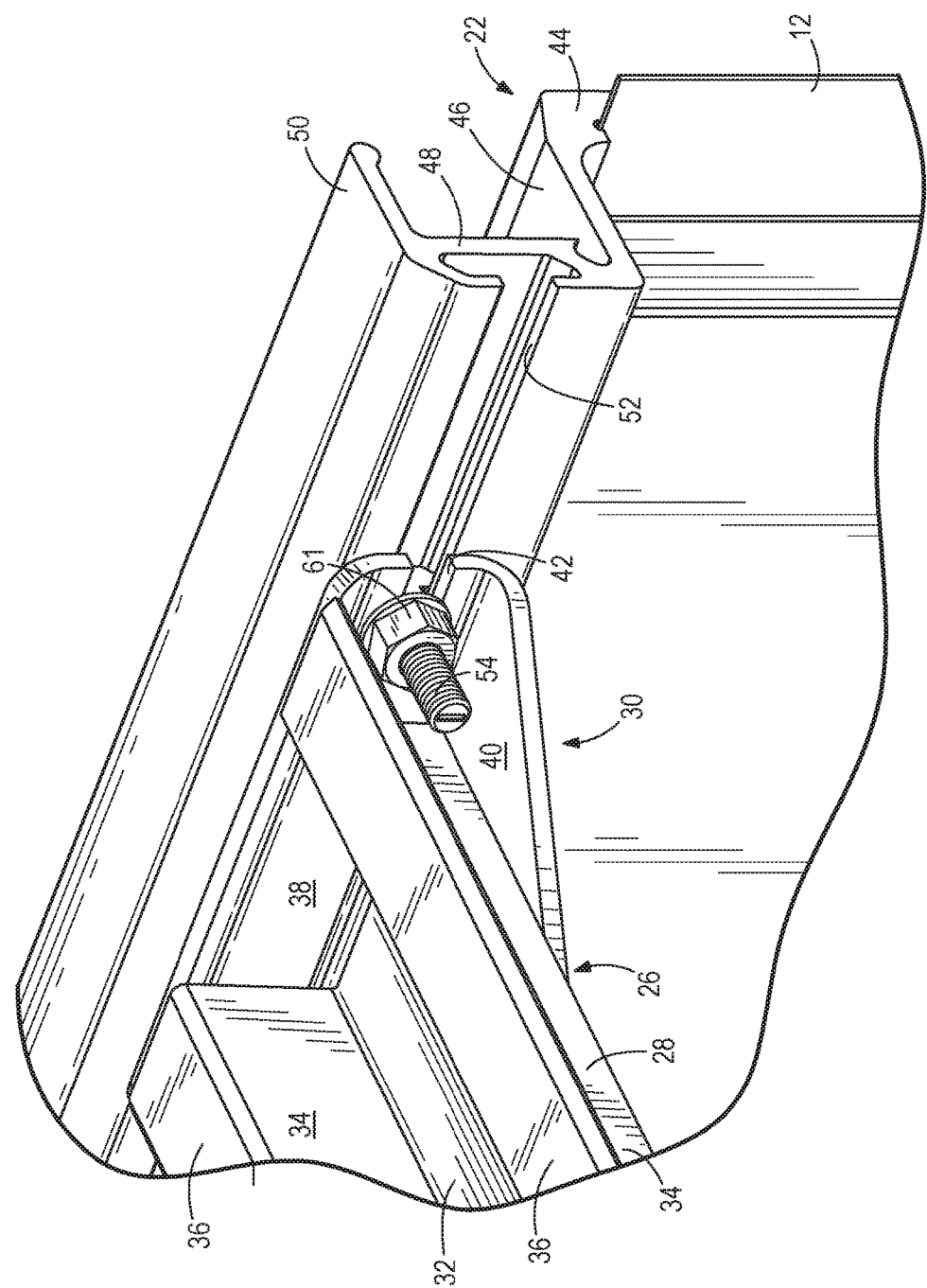
FIG. 4 is a perspective view of the installed roof bow of FIG. 3.

FIG. 3 illustrates an upper rail 22 which supports a first end of a roof bow 26. A second end of the roof bow 26 (not shown) mirrors the first end and is supported by a second upper rail 222 in a similar manner. The roof bow 26 spans the width W of the trailer between parallel sidewalls 12 and includes a flanged channel beam 28 with end caps 30. The flanged channel beam 28 includes a lower portion 32 which transitions to side portions 34, perpendicular to the lower portion 32 thereby defining a channel. Upper flanges 36 extend outward from the side portions 34. When assembled, the base portion 32 and the upper flanges 36 are parallel to one another and the roof 13 of the trailer 10. The upper flanges 36 may include apertures (not shown) for fixing the roof 13 to the roof bow 26, which, when assembled, is adjacent the roof 13. When assembled, the beam 28 may be under compression in an arcuate shape.

The end caps 30 are fixed (e.g., welded, bolted, etc.) to the flanged channel beam 28 at the ends of the beam 28, thereby abutting the upper rail 22 when installed. The end cap 30 includes a first surface 38 which is parallel with the sidewalls 12 (and is therefore also parallel with a constant cross-section of the beam 28). The first surface 38 extends beyond at least one of the side portions 34 of the beam 28, such that a slot 42 in the end cap 30 extends from an edge of the end cap 30 without extending into the channel. A slot may have one or more open ends (e.g., slot 42), or alternatively may have no open ends (e.g., slot 142, 242). A second surface 40 extends perpendicular from the first surface 38. The second surface 40 is parallel and adjacent to the lower portion 32 of the beam 28 to provide structural support for the beam 28. The second surface 40 may also include an aperture (not shown) for a fastener to fix the end cap 30 to the beam 28.

The upper rail 22 is fixed to the sidewall 12 and extends upward (i.e., away from the floor) from the sidewall 12 to span the gap between the sidewall 12 and the roof 13. The upper rail 22 has a constant cross-section along the lengthwise direction L of the trailer 10. As shown in FIG. 3, the upper rail 22 includes a first portion 44, a second portion 46, a channel 48, and a third portion 50. Though described as separate portions 44, 46, 48, 50, the upper rail 22 may be formed as a single component (e.g., via extrusion, etc.). The first portion 44 extends upward from the sidewall 12 and is fixed to the sidewall 12 via a fastener (i.e., bolt, rivet, etc.). The second portion 46 extends into the interior receiving volume of the trailer 10, perpendicular to the first portion 44. The channel 48 is offset from and extends parallel to the first portion 44, and connects the second portion 46 to the third portion 50. The channel 48 is described in greater detail below. The third portion 50 is parallel to the second portion and extends away from the interior receiving volume of the trailer 10. The third portion 50 is a lip for holding the roof 13 at the upper rail 22. As shown in FIG. 3, the roof 13 extends around the third portion 50. In installation, the roof 13 may be slidably attached to the upper rail 22 or may be bent or crimped around the third portion 50.

Figure 5:
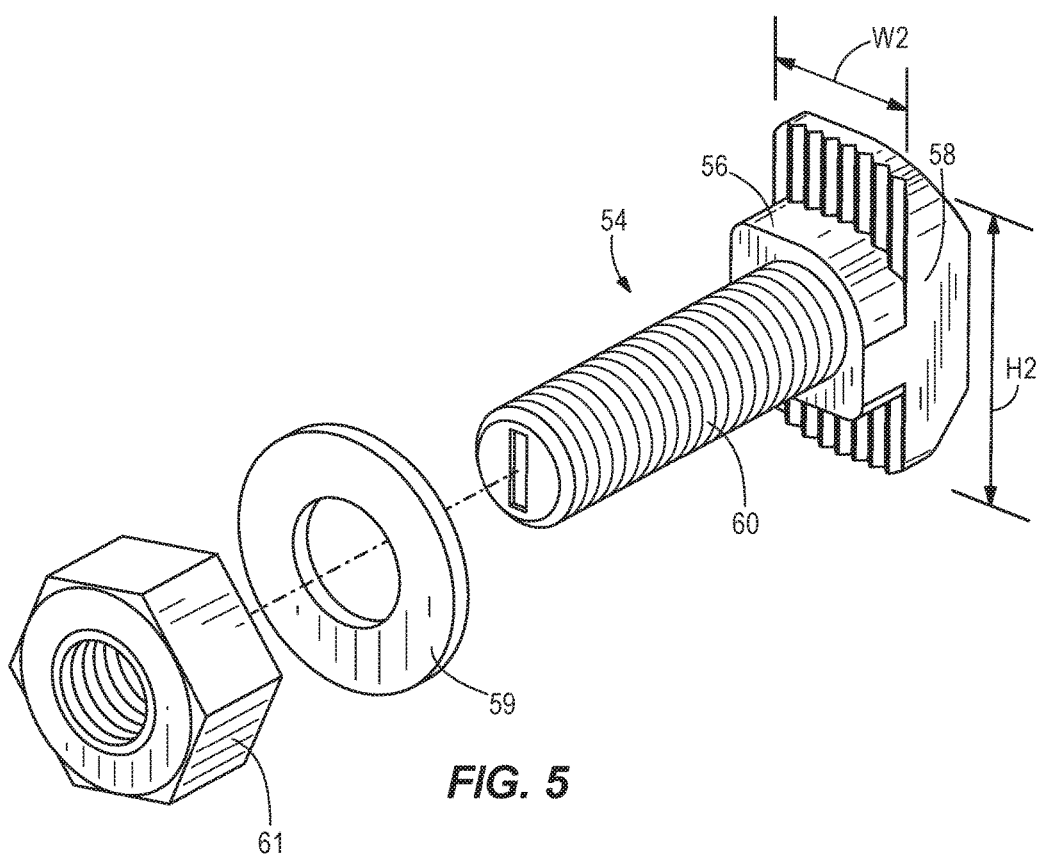
FIG. 5 is a perspective view of a nut and T-bolt assembly.

The channel 48 has a similar height (parallel to the height H of the trailer 10) as the end cap 30 of the mating roof bow 26. The channel 48 is a C-shaped channel with an opening 52 extending along the length of the rail 22. The height of the opening 52 is similar to the height of the slot 42 and is less than the height of the channel 48 itself. The height of the opening is sized to accept the shank 56 or threads 60 of a fastener 54 such as a bolt, which is shown in greater detail in FIG. 5.

The bolt 54 is a T-bolt with a rectangular head 58. The rectangular head 58 is centered upon the shank 56 with a width W2 substantially equal to the diameter of the shank 56 and a height H2 greater than the width W2. The shank portion 56 transitions to the threaded portion 60.

Prior to assembling the roof bows 26 to the upper rails 22, the roof 13 may be fixed to the lip 50 of the upper rail 22 such that installation of the roof bows 26 takes place from within the cargo receiving interior volume of the trailer 10. Additionally, temporary supports may be placed between the upper rails 22 (offset from the placement of the roof bows 26) to provide some structural rigidity prior to installation of the roof bows 26. In installation, the roof bow 26 is placed adjacent the roof 13 with one or both of the end caps 30 compressed between opposing upper rails 22 such that the slot 42 in the roof bow 26 is aligned with the opening 52 in the upper rail 22. The head 58 of the bolt 54 is moved through the opening 52 in the channel 48 in a first direction. Once within the channel 48, the bolt 54 is rotated a quarter turn such that height H2 of the head 58 is parallel with the height H of the trailer 10. Once rotated, the geometry of the channel allows the bolt 54 to slide along the channel 48 in the lengthwise direction L without permitting removal of the bolt 54 from the channel 48 in the first direction (i.e., the head 58 of the bolt 54 is rotated to interact with the inside channel 48 if moved in the first direction). The bolt 54 is slid into the slot 42 and is clamped with a washer 59 and a fastener 61 such as a nut. The bolt 54 and fastener 61 fix the channel 48 of the upper rail 22 to the roof bow 26. Once the roof bows 26 are fixed, the temporary supports are removed.

Contrary to current practices, the assembly of the roof bow 26 does not require piercing through the upper rail 22 (i.e., with a bolt or rivet, etc.). Therefore, assembly does not require any drilling or punching, and does not require precise hole placement. Further, the upper rail 22 is not weakened by drilled or punched holes, there are fewer points for water infiltration, and the outside of the outer rail 22 (outside of the cargo receiving interior volume) retains a more aesthetically pleasing surface.

Figure 6:
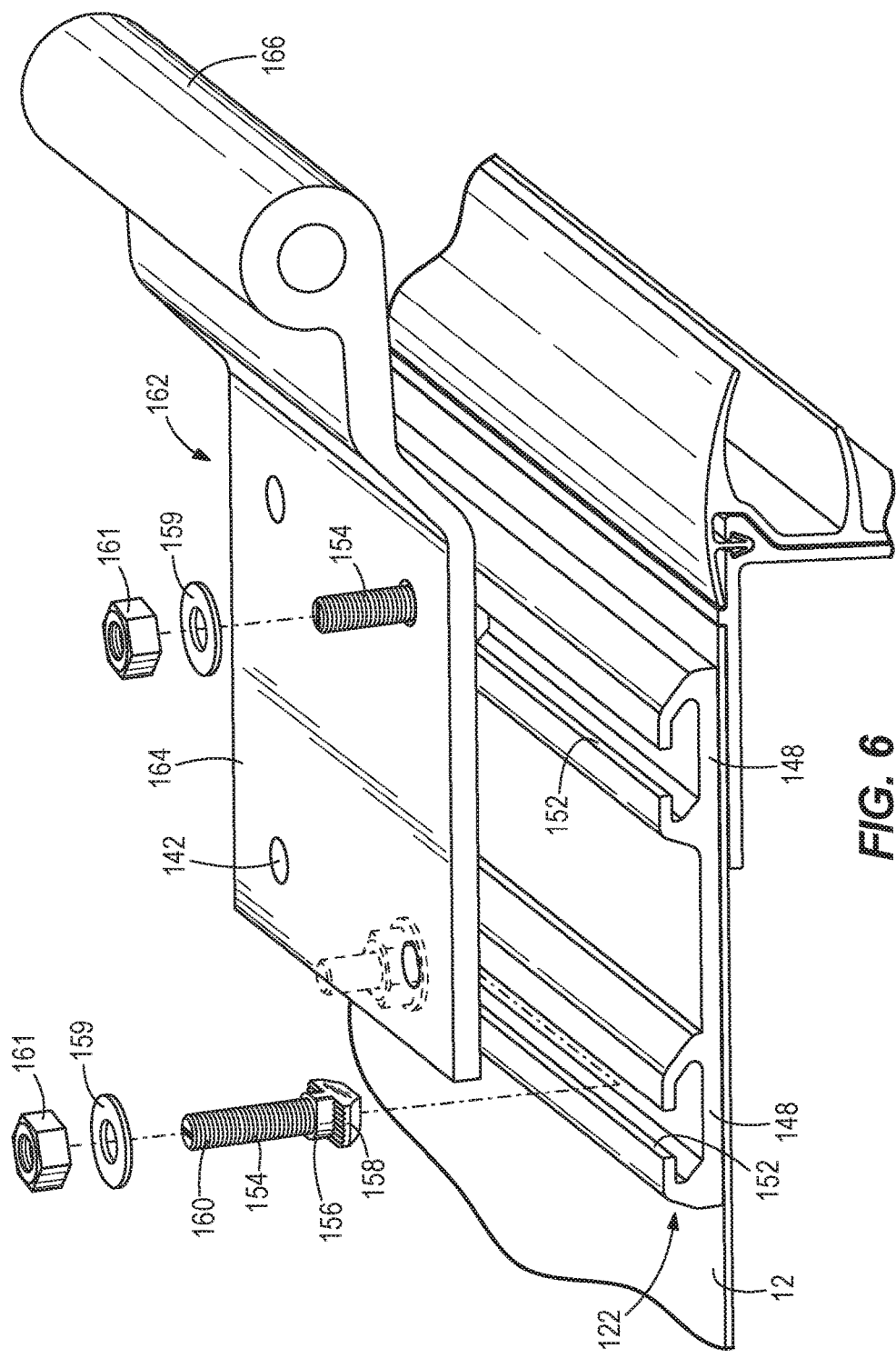
FIG. 6 is a partial perspective view of a door hinge and track of the present invention.

Fasteners 154 such as T-bolts may be utilized in alternative locations throughout the trailer 10. As shown in FIG. 6, a door hinge plate 162 (i.e., door side or frame side) is fixed to a track 122. The door hinge plate 162 includes a leaf 164 with one or more knuckles 166. The leaf 164 includes a number of slots (i.e., apertures 142) for mounting to one or more channels 148 of the track 122 with fasteners 154. The knuckles 166 interlace with knuckles on an adjacent hinge plate (i.e., the other of the door side hinge plate or the frame side hinge plate). A pin (not shown) is engaged with the interlaced knuckles 166 to fix the door panel 18 to the sidewall 12. Alternatively, the door panel 18 is fixed to a different surface (e.g., roof 13 or floor 14) of the trailer 10, dependent upon the direction of travel of the door panel 18.

The track 122 is fixed to one of the sidewalls 12 (frame side hinge plate) or to one of the door panels 18 (door side hinge plate). The track 122 includes two C-shaped channels 148 parallel to and spaced apart from one another. With the channels 148 parallel to one another, the track 122 may be produced with a constant cross-section through a process such as extrusion. Alternatively, the channels 148 may be perpendicular to one another and intersect with one another and/or may be located at an alternative angle relative to one another. Each channel 148 includes an opening 152 extending along the length of the track 122. The height of the opening 152 is similar to the diameter of the orifice 142 (i.e., both are sized to accept the shank 156 or threads 160 of the fastener 154).

In assembling the door hinge plate 162 to the track 122, the heads 158 of the bolts 154 (one corresponding to each aperture 142) are placed within the openings 152 in the channels 148 and are rotated a quarter turn to prevent removal of the bolts 154. The bolts 154 are moved along the channels 126 until they are positioned to accept the door hinge plate 162. Once positioned correctly, the door hinge plate 162 is placed adjacent the track 122 such that the bolts 154 extend through the apertures 142. If the knuckles 166 of the door hinge plate 162 are aligned to interlace with the mating knuckles, fasteners 161 such as nuts (along with washers 159) are threaded onto the bolts 154 to fix the door hinge plate 162 to the track 122. If the knuckles 166 are not properly aligned, the door hinge plate 162 slides along the track 122 until properly aligned. This allows for precise door alignment without necessitating the drilling or punching of permanent holes through the door 18 or sidewall 12. Further, utilizing two channels 148 and a plurality of bolts 154 reduces the torsional force on each bolt 154 caused by the offset weight of the door 18.

Figure 7:
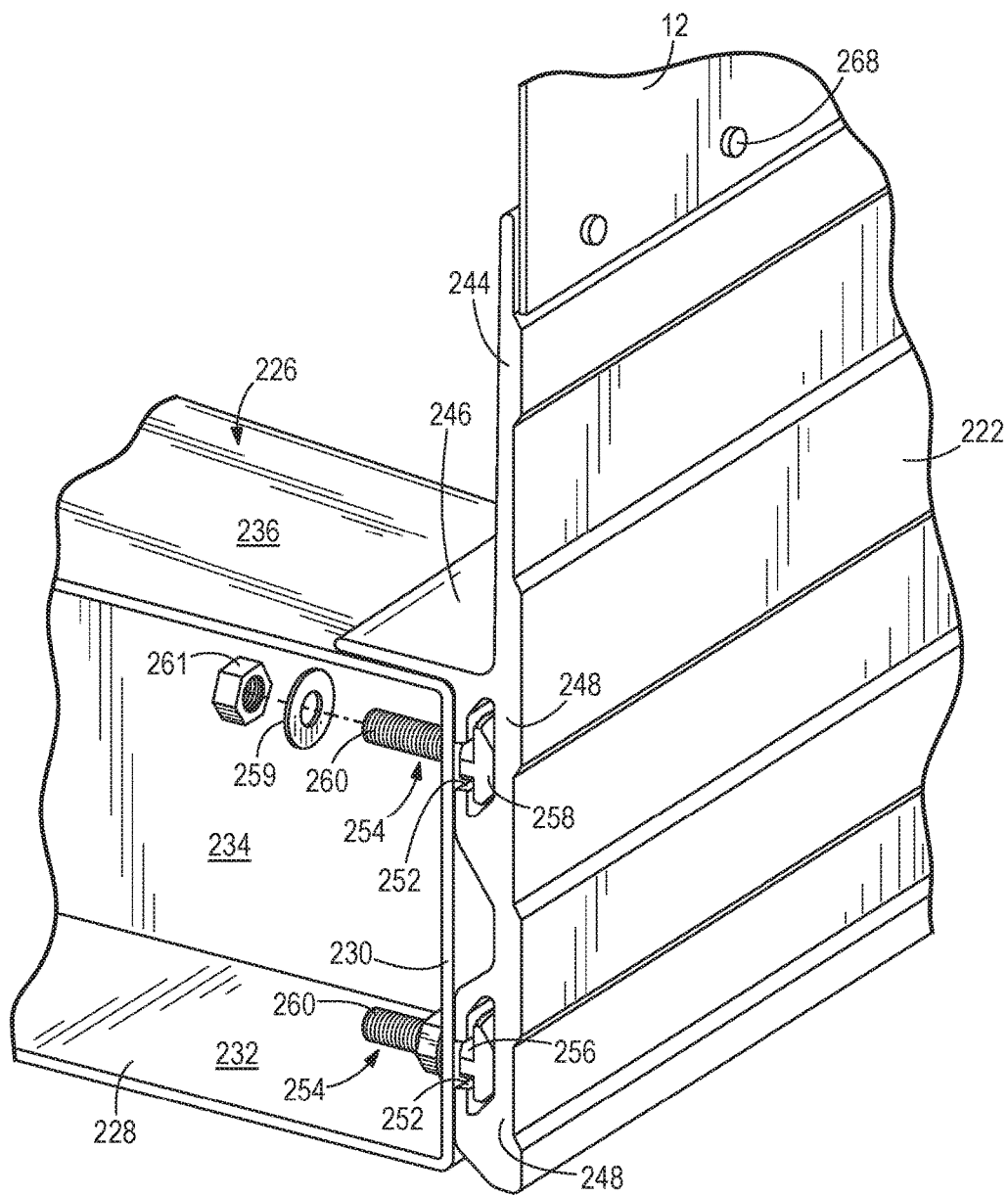
FIG. 7 is a partial perspective view of a cross-member and a lower rail of the present invention.

FIG. 7 illustrates a lower rail 222 which supports a first end of a cross member 226. A second end of the cross member 226 (not shown) mirrors the first end and is supported by a second lower rail 222 in a similar manner. The cross member 226 spans the width W of the trailer between parallel sidewalls 12 and includes an I-beam 228 with flat end caps 230. The I-beam 228 includes a lower portion 232 which transitions to a central portions 234, perpendicular to the lower portion 232. An upper portion 236 extends outward from the central portion 234 to form a constant cross-section of the letter "I". When assembled, the lower portion 232 and the upper portion 236 are parallel to one another and the roof 13 of the trailer 10. The upper portion 236 may include apertures (not shown) for fixing the floor 14 to the cross member 226, which, when assembled, is adjacent the floor 14.

The flat end caps 230 are fixed (e.g., welded, bolted, etc.) to the I-beam 228 at the ends of the beam 228, thereby abutting the lower rail 222 when installed. Each end cap 230, as shown, is a flat panel which is parallel with the sidewalls 12 (and is therefore also parallel with a constant cross-section of the beam 228). The end cap 230 includes a plurality of slots (i.e., apertures 242) for accepting fasteners 254. The present embodiment includes four apertures 242, two apertures 242 to each side of the central portion 234. The lower rail 222 includes two channels 248, with openings 252 in each channel 248 aligning with two of the four apertures 242. Alternatively, the apertures 242 may be replaced by slots extending to an edge of the end caps 230, similar to the slot 42 shown in FIG. 3.

The lower rail 222 is fixed to the sidewall 12 and extends downward (i.e., towards the floor 14) from the sidewall 12 to span the gap between the sidewall 12 and the floor 14. The lower rail 222 has a constant cross-section along the lengthwise direction L of the trailer 10. As shown in FIG. 7, the lower rail 222 includes a first portion 244, a second portion 246, and a plurality of channels 248. Though described as separate portions 244, 246, 248, the lower rail 222 may be formed as a single component (e.g., via extrusion, etc.). The first portion 244 extends downward from the sidewall 12 and is fixed to the sidewall 12 via a plurality of fasteners 268 (i.e., bolts, rivets, etc.). The second portion 246 extends into the interior receiving volume of the trailer 10, perpendicular to the first portion 244.

The second portion 246 of the lower rail 222 prohibits dirt, debris, and condensation from entering the channels 248 from above. Further, the second portion provides a surface for supporting the floor 14 of the trailer 10 and prohibits a point force adjacent the sidewall 12 from shearing the fasteners 254.

The channels 248 extend parallel to the first portion 244 and collectively have a similar height (parallel to the height H of the trailer 10) as the end cap 230 of the mating cross member 226. The channels 248 are C-shaped channels, each with an opening 252 extending along the length of the rail 222. The height of the opening 252 is similar to the height of the aperture 242 and is less than the height of the channel 248 itself. The height of the opening 252 is sized to accept the shank 256 or threads 260 of the fastener 254 such as a bolt, which is shown in greater detail in FIG. 5.

In assembling the cross member 226 to the lower rail 222, the heads 258 of the bolts 254 (one corresponding to each aperture 242) are placed within the openings 252 in the channels 226 and are rotated a quarter turn to prevent removal of the bolts 254. The bolts 254 are moved along the channels 248 until they are positioned to accept the cross member 226. Once positioned correctly, the cross member 226 is placed adjacent the lower rail 222 such that the bolts 254 extend through the apertures 242. If the cross member 226 is properly aligned (i.e., evenly spaced from adjacent cross members) fasteners 261 such as nuts (along with washers 259) are threaded onto the bolts 254 to fix the cross member 226 to the lower rail 222. If the cross member 226 is not properly aligned, the cross member 226 slides along the tracks via the fasteners 254 until properly aligned. Contrary to current practices, this allows for precise alignment of the cross member 226 without necessitating the drilling or punching of permanent holes through the sidewall 12 or lower rail 222. This prevents the ill effects of external conditions (e.g., ice, rain, contact with road debris) upon fasteners which extend through to the exterior of the cargo body, which can lead to oxidation or rust.

What is claimed is:

1. A cargo body comprising:
   a floor comprising a floor panel provided to support a load;
   a first longitudinal rail extending in a lengthwise direction of the cargo body, the first longitudinal rail having an interior side and an exterior side opposite the interior side;
   a second longitudinal rail extending in the lengthwise direction of the cargo body, parallel to the first longitudinal rail at a fixed distance therefrom, the second longitudinal rail having an interior side and an exterior side opposite the interior side, wherein the interior side of at least one of the first and second longitudinal rails is provided with a longitudinally extending channel open along an interior side thereof; and
   a plurality of transverse beams, each having a first end fixed to the first longitudinal rail and a second end fixed to the second longitudinal rail,
   wherein each of the plurality of transverse beams is secured to at least one of the first and second longitudinal rails by at least one fastener partially retained inside the channel of the longitudinal rail and extending through the first or second end of the transverse beam, the plurality of transverse beams being secured in place between the first and second longitudinal rails without penetrating either of the first and second longitudinal rails to leave exposed surfaces at the exterior sides thereof intact at locations of the plurality of transverse beams.

2. The cargo body of claim 1, further comprising first and second sidewalls extending both in the lengthwise direction and vertically from the floor panel.

3. The cargo body of claim 2, wherein the first and second longitudinal rails are upper rails provided at respective upper ends of the first and second sidewalls, and wherein the plurality of transverse beams are roof bows.

4. The cargo body of claim 2, wherein the first and second longitudinal rails are lower rails provided at respective lower ends of the first and second sidewalls, and wherein the plurality of transverse beams are cross members supporting the floor panel.

5. The cargo body of claim 4, further comprising a first upper rail provided at an upper end of the first sidewall; a second upper rail provided at an upper end of the second side wall; and a plurality of roof bows spanning between the first and second upper rails at various positions along the lengthwise direction, such that a first end of each of the plurality of roof bows lies adjacent an interior side of the first upper rail and a second end of each of the plurality of roof bows lies adjacent an interior side of the second upper rail.

6. The cargo body of claim 5, wherein each of the plurality of roof bows is secured to at least one of the first and second upper rails by at least one fastener partially retained inside a channel of the upper rail and extending through the first or second end of the roof bow.

7. The cargo body of claim 1, wherein the channel formed in each of the first and second longitudinal rails has a C-shaped cross-section.

8. The cargo body of claim 1, wherein the at least one fastener includes a T-bolt paired with a nut engaged with the T-bolt to provide a clamping force between the transverse beam and the corresponding one of the first and second longitudinal rails.

9. The cargo body of claim 1, wherein the end of each of the plurality of transverse beams includes an end cap having a slot with one open end and one closed end.

10. The cargo body of claim 1, wherein
the interior side of each of the first and second longitudinal rails is provided with a longitudinally extending channel open along an interior side thereof, such that the longitudinally extending channels of the first and second longitudinal rails are open toward each other in facing relationship, and wherein
the first end of the transverse beam is secured to the first longitudinal rail by the at least one fastener partially retained inside the channel of the first longitudinal rail and extending through the first end of the transverse beam, and wherein the second end of the transverse beam is secured to the second longitudinal rail by at least one additional fastener partially retained inside the channel of the second longitudinal rail and extending through the second end of the transverse beam.

11. A cargo body comprising:
a floor comprising a floor panel provided to support a load;
a first longitudinal rail extending in a lengthwise direction of the cargo body, the first longitudinal rail having a longitudinally extending channel formed therein;
a second longitudinal rail extending in the lengthwise direction of the cargo body, parallel to the first longitudinal rail at a fixed distance therefrom, the second longitudinal rail having a longitudinally extending channel formed therein; and
a plurality of transverse beams spanning between the first and second longitudinal rails at various positions along the lengthwise direction, such that a first end of each of the plurality of transverse beams lies adjacent the first longitudinal rail and a second end of each of the plurality of transverse beams lies adjacent the second longitudinal rail,
wherein each of the plurality of transverse beams is secured to the first and second longitudinal rails exclusively by a plurality of fasteners including at least one T-bolt having a head retained inside the channel of the first longitudinal rail and extending through the first end of the transverse beam, and at least one T-bolt having a head retained inside the channel of the second longitudinal rail and extending through the second end of the transverse beam.

12. The cargo body of claim 11, wherein the end of each of the plurality of transverse beams includes an end cap having a slot with one open end and one closed end.

13. The cargo body of claim 11, wherein the plurality of fasteners secure the plurality of transverse beams to the first and second longitudinal rails without penetration through exterior-facing sides of either of the first and second longitudinal rails such that exposed surfaces of the exterior-facing sides remain completely intact at locations of the plurality of transverse beams when secured.

14. The cargo body of claim 11, further comprising first and second sidewalls extending both in the lengthwise direction and vertically from the floor panel.

15. The cargo body of claim 14, wherein the first and second longitudinal rails are lower rails provided at respective lower ends of the first and second sidewalls, and wherein the plurality of transverse beams are cross members supporting the floor panel.

16. The cargo body of claim 15, further comprising a first upper rail provided at an upper end of the first sidewall; a second upper rail provided at an upper end of the second side wall; and a plurality of roof bows spanning between the first and second upper rails at various positions along the lengthwise direction, such that a first end of each of the plurality of roof bows lies adjacent an interior side of the first upper rail and a second end of each of the plurality of roof bows lies adjacent an interior side of the second upper rail.

17. The cargo body of claim 16, wherein each of the plurality of roof bows is secured to the first and second upper rails exclusively by a plurality of fasteners including at least one T-bolt having a head retained inside a channel formed in the interior side of the first upper rail and extending through the first end of the roof bow, and at least one T-bolt having a head retained inside a channel formed in the interior side of the second upper rail and extending through the second end of the roof bow.

18. The cargo body of claim 14, wherein the first and second longitudinal rails are upper rails provided at respective upper ends of the first and second sidewalls, and wherein the plurality of transverse beams are roof bows.

19. The cargo body of claim 11, wherein the channel formed in each of the first and second longitudinal rails has a C-shaped cross-section that is open on one side.

20. The cargo body of claim 11, wherein each T-bolt of the plurality of fasteners is paired with a nut engaged with the T-bolt to provide a clamping force between the transverse beam and the corresponding one of the first and second longitudinal rails.

\* \* \* \* \*